United States Patent [19]

Patel

[11] Patent Number: 5,653,362
[45] Date of Patent: Aug. 5, 1997

[54] IMPROVED THERMAL LID AND BEVERAGE SERVER

[75] Inventor: Dahyabhai U. Patel, Vancouver, Canada

[73] Assignee: Cafe 98 Industries Limited, New Westminster, Canada

[21] Appl. No.: 229,874

[22] Filed: Apr. 19, 1994

[51] Int. Cl.[6] .................................................. B67D 5/39
[52] U.S. Cl. ...................... 222/156; 222/472; 222/475.1; 222/500
[58] Field of Search .................................. 222/156, 157, 222/470, 472, 500, 481.5, 482, 545, 556, 475.1

[56] References Cited

U.S. PATENT DOCUMENTS

| | | |
|---|---|---|
| 1,819,279 | 8/1931 | Coyle . |
| 2,096,848 | 10/1937 | Felix .................................. 222/157 X |
| 2,562,010 | 7/1951 | Aitken .................................... 150/8 |
| 2,682,970 | 7/1954 | Brothers ................................... 220/44 |
| 3,018,025 | 1/1962 | Wynn .................................... 222/500 |
| 3,716,169 | 2/1973 | Chivers .................................. 222/157 |
| 4,482,083 | 11/1984 | Beck ...................................... 222/500 |
| 4,646,933 | 3/1987 | Jurczenia et al. ....................... 220/366 |
| 4,676,411 | 6/1987 | Simasaki .............................. 222/472 X |
| 4,739,898 | 4/1988 | Brown .................................... 220/203 |
| 4,770,318 | 9/1988 | Earl ........................................ 220/307 |
| 4,858,787 | 8/1989 | Stone .................................... 222/188 |
| 5,273,194 | 12/1993 | McNamara .......................... 222/472 X |

*Primary Examiner*—Gregory L. Huson
*Attorney, Agent, or Firm*—Fitzpatrick, Cella, Harper & Scinto

[57] ABSTRACT

A beverage server includes a body having an internal reservoir to hold a beverage such as hot coffee. In one embodiment, a lid is pivotally connected to the top of the body. The lid has a generally conical passage provided through it which permits a beverage to enter the beverage server and pass into the reservoir without requiring removal of the lid. A floatable ball is located within the passage to seal it when no liquid is entering the beverage server. A pouring spout extends from the body near its top and is in fluid communication with the reservoir when the beverage server is tilted and the lid pivots. A counter-weight in the lid assists in bringing the lid into sealing engagement with the body to isolate the pouring spout and the reservoir when the beverage server is upright. The counter-weight also assists in smooth motion of the lid as it pivots through its entire range of movement when the beverage server is tilted.

20 Claims, 12 Drawing Sheets

IMPROVED THERMAL LID AND BEVERAGE SERVER

FIELD OF THE INVENTION

The present invention relates to beverage servers and in particular to a beverage server having a pouring spout and lid which permits a beverage to enter the beverage server without requiring its removal.

BACKGROUND OF THE INVENTION

Beverage servers are well known in the art and many designs have been considered. In the coffee-making art, many types of beverage servers are available and are selected depending on the type of coffee-making equipment used and the environment in which the equipment is located.

One common type of beverage server has a pyrex® body with an open upper end. A carrying handle is integral with a ring that surrounds the upper end of the body and which tapers outwardly opposite the handle to define a pouring spout. This facilitates pouring of coffee from the body into a receptacle such as a coffee cup when the beverage server is tilted. This type of beverage server is typically used with a hot burner type coffee-making machine and is capable of withstanding the temperature of the coffee-making machine's heating element. Because the beverage server is placed on a heating element, the open upper end of the body is not of concern as the constant heating from the heating element far exceeds any heat loss via the open upper end of the body.

Another type of beverage server is disclosed in U.S. Pat. No. 5,038,959 to Patel issued on Aug. 13, 1992 and assigned to Cafe 98 Industries Limited, the assignee of the present invention. The beverage server disclosed in this patent is insulated and is designed to minimize heat loss so that hot beverages poured into it such as coffee, remain hot for an extended period of time without the need for a heating element. A dispensing outlet is located at the bottom of the beverage server and can be manually actuated to dispense coffee under the influence of gravity. A lid with a conical passage through it, is removably secured to the top of the beverage server. The conical passage allows coffee to flow through the lid and into the beverage server without having to remove the lid. Therefore, this type of beverage server is placed directly below the filter basket of the coffee-making machine so that brewed coffee is poured directly into it. A floatable ball sits in the passage to seal it when no coffee is received in the passage. This minimizes heat loss through the passage. A vent in the form of a space between the lid and the beverage server and an aperture in the lid, allows air to be expressed from the beverage server when coffee enters the beverage server via the passage. This design allows coffee to enter the beverage server without removal of the lid and ensures that air is expressed from the beverage server through the vent and not through the passage to minimize bubbling through the passage which can cause overflow problems as coffee passes through the lid.

Although this type of beverage server works satisfactorily, it is not well suited for some environments and particularly that of the restaurant business since it is designed to remain beneath the filter basket of the cofee-making machine. In the restaurant business, when serving hot beverages such as coffee, it is often necessary to serve many cups of coffee to a number of patrons at different tables. This is typically done by placing coffee in a server such as the first one described above and carrying the beverage server to the tables. When a patron wants a cup of coffee, the waiter/waitress simply pours the coffee into the patron's cup.

Although, beverage servers of the type to be used with hot burner type coffee-making machines are suitable in the restaurant business, it has been found that the taste of the coffee is more preferred when the coffee is not subjected to constant heating via a heating element. Insulated beverage servers which can be carried and allow coffee in them to be poured are available. Unfortunately, brewed coffee cannot be poured directly into beverage servers of this type. Also, the lids typically used with beverage servers of this nature must be manually opened and closed by unscrewing the lid, making them difficult and awkward to use in some environments. Therefore, there is a need for a beverage server which allows a beverage therein to be poured and which provides a passage to allow the beverage to enter the beverage server without requiring removal of the lid.

It is therefore an object of the present invention to provide a novel beverage server.

SUMMARY OF THE INVENTION

According to one aspect of the present invention there is provided a beverage server comprising:

a body having an open upper end;

a reservoir within said body adapted to hold a beverage;

a pouring spout on said body communicating with said reservoir to allow a beverage therein to be poured from said reservoir upon tilting of said beverage server; and a lid pivotally connected to said body and covering said open upper end, said lid having a first passage therethrough to allow a beverage to enter said reservoir without removal of said lid; and means to bring said lid into sealing engagement with said body when said beverage server is upright to isolate substantially, said reservoir from said pouring spout.

Preferably, the means to bring the lid into sealing engagement with the body is in the form of a counter-weight extending downwardly from the bottom surface of the lid. It is also preferred that the counter-weight acts to assist in the smooth pivotal movement of the lid when the beverage server is tilted. Preferably, the lid has a seal about its circumference, with the counter-weight bringing the seal into sealing engagement with a channel in the pouring spout to isolate substantially, the reservoir from the pouring spout when the beverage server is upright. It is also preferred that the counter-weight is generally arcuate in configuration and has a radius of curvature generally the same as the first passage, the counter-weight being positioned on the lid diametric of the pouring spout.

Preferably, at least one groove is formed in an interior wall of the body adjacent the seal to define a vent for the expression of air from the reservoir when a beverage is entering the reservoir via the first passage. In a specific embodiment, two spaced grooves are formed in the interior wall, the grooves being located opposite the pouring spout to avoid beverage entering the grooves when the beverage server is tilted.

Preferably, the reservoir has an internal surface lined with a generally opaque coating and the body has at least one viewing aperture formed therein, with the opaque coating being removed from a portion the internal surface at least at a location adjacent the at least one aperture to allow the beverage level in the beverage server to be visually determined. In one embodiment, the body has a pair of viewing apertures therein and with a generally transparent protective strip being positioned between the apertures and the reservoir.

In another aspect of the present invention there is provided a beverage server comprising:

a body having an open upper end;

a reservoir within said body adapted to hold a beverage;

a pouring spout on said body communicating with said reservoir to allow a beverage therein to be poured from said reservoir upon tilting of said beverage server; and a lid covering said open upper end, said lid having a first passage therethrough to allow a beverage to enter said reservoir without removal of said lid; a second passage therethrough allowing a beverage to flow from said reservoir to said pouring spout upon tilting of said beverage server; valve means to inhibit back flow of said beverage from said reservoir through said first passage upon tilting of said beverage server; and vent means to permit the expression of air from said reservoir when a beverage enters said reservoir via said first passage.

Preferably, the valve means includes a pipe section having a constriction in it and which is in communication with the first passage. A valve member is moveable within the pipe section to seal the pipe section at the constriction upon tilting of the beverage server. It is also preferred that the pipe section is conical in shape with the smaller diameter end of the pipe section constituting the constriction. When the beverage server is tilted, the valve member moves to seal the smaller diameter end of the pipe section.

Preferably, the second passage includes a pouring chamber housing a floatable ball. When the beverage server is in an upright position, the floatable ball seals the second passage but when the beverage server is tilted and a beverage enters the second passage, the floatable ball floats in the pouring chamber allowing the beverage to be poured.

It is also preferred that the first passage includes a float chamber housing a floatable ball to seal the first passage when no beverage is entering the reservoir but which floats to open the first passage when a beverage enters the first passage.

In still yet another aspect of the present invention there is provided a lid for use with a beverage server of the type having a body with a reservoir therein adapted to hold a beverage, an open upper end permitting fluid access to said reservoir and adapted to receive said lid and a pouring spout adjacent said open upper end to allow a beverage in said reservoir to be poured from said beverage server upon firing thereof, said lid comprising:

a first passage therethrough to allow a beverage to enter said reservoir without removal of said lid;

a second passage therethrough to allow a beverage to flow from said reservoir to said pouring spout upon firing of said beverage server;

valve means to inhibit back flow of said beverage from said reservoir through said first passage upon tilting of said beverage server; and vent means to permit the expression of air from said reservoir when a beverage enters said reservoir via said first passage.

According to still yet another aspect of the present invention there is provided a beverage container comprising:

a body having an open upper end; and a reservoir within said body adapted to hold a beverage, said reservoir having an internal surface lined with a generally opaque coating wherein said body has at least one viewing aperture formed therein and wherein said opaque coating is removed from a portion of said internal surface at least at a location adjacent said at least one aperture to allow the beverage level in said beverage container to be visually determined.

The present invention provides advantages in that a beverage can be poured directly into the beverage server without removal of the lid and the beverage server can be carried conveniently to a desired location where the beverage can be poured from the beverage server into a receptacle such as a cup. Since the lid is designed substantially to seal the beverage server when it is upright, heat loss is minimized when a beverage is not being poured or is not entering the reservoir.

BRIEF DESCRIPTION OF THE DRAWINGS

Embodiments of the present invention will now be described more fully with reference to the accompanying drawings in which:

FIG. 9b is a bottom plan view of the top cap illustrated in FIG. 9a;

FIG. 9c is a top plan view of the top cap illustrated in FIG. 9a;

FIG. 9d is a side elevation view of the top cap illustrated in FIG. 9a;

FIG. 10b is a bottom plan view of the funnel housing illustrated in FIG. 10a;

FIG. 10c is a top plan view of the funnel housing illustrated in FIG. 10a;

FIG. 10d is a side elevation view of the funnel housing illustrated in FIG. 10a;

FIG. 11b is a bottom plan view of the thermos housing illustrated in FIG. 11a;

FIG. 11c is a sectional view taken along line A—A of the thermos housing illustrated in FIG. 11a;

FIG. 11d is a top plan view of the thermos housing illustrated in FIG. 11a;

FIG. 11e is a side elevation view of the thermos housing illustrated in FIG. 11a;

FIG. 12b is an end elevation view of the flow pipe illustrated in FIG. 12a.

DESCRIPTION OF THE PREFERRED EMBODIMENTS

Figure 1:
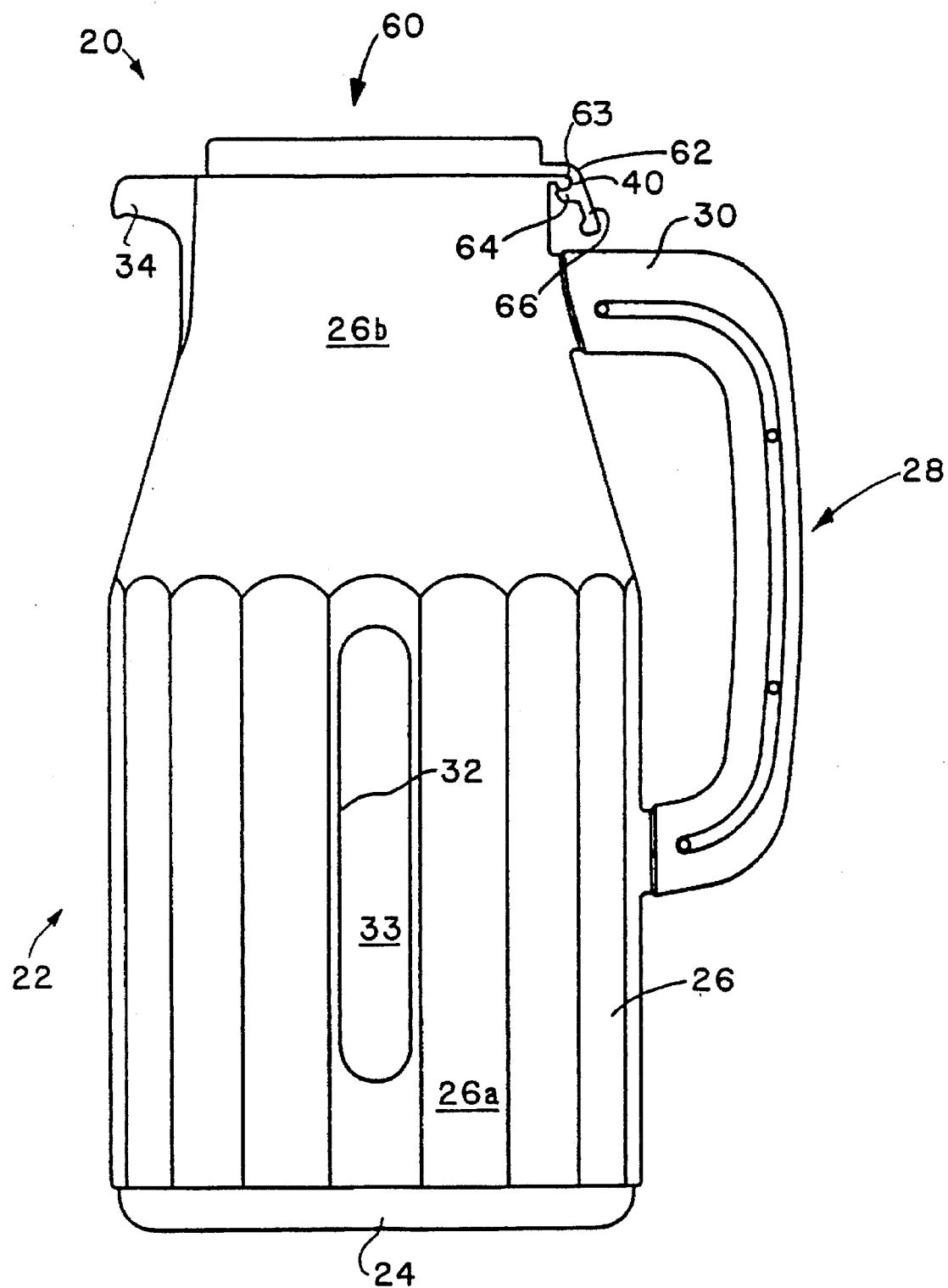
FIG. 1 is a side elevation view of a beverage server.
Figure 2:
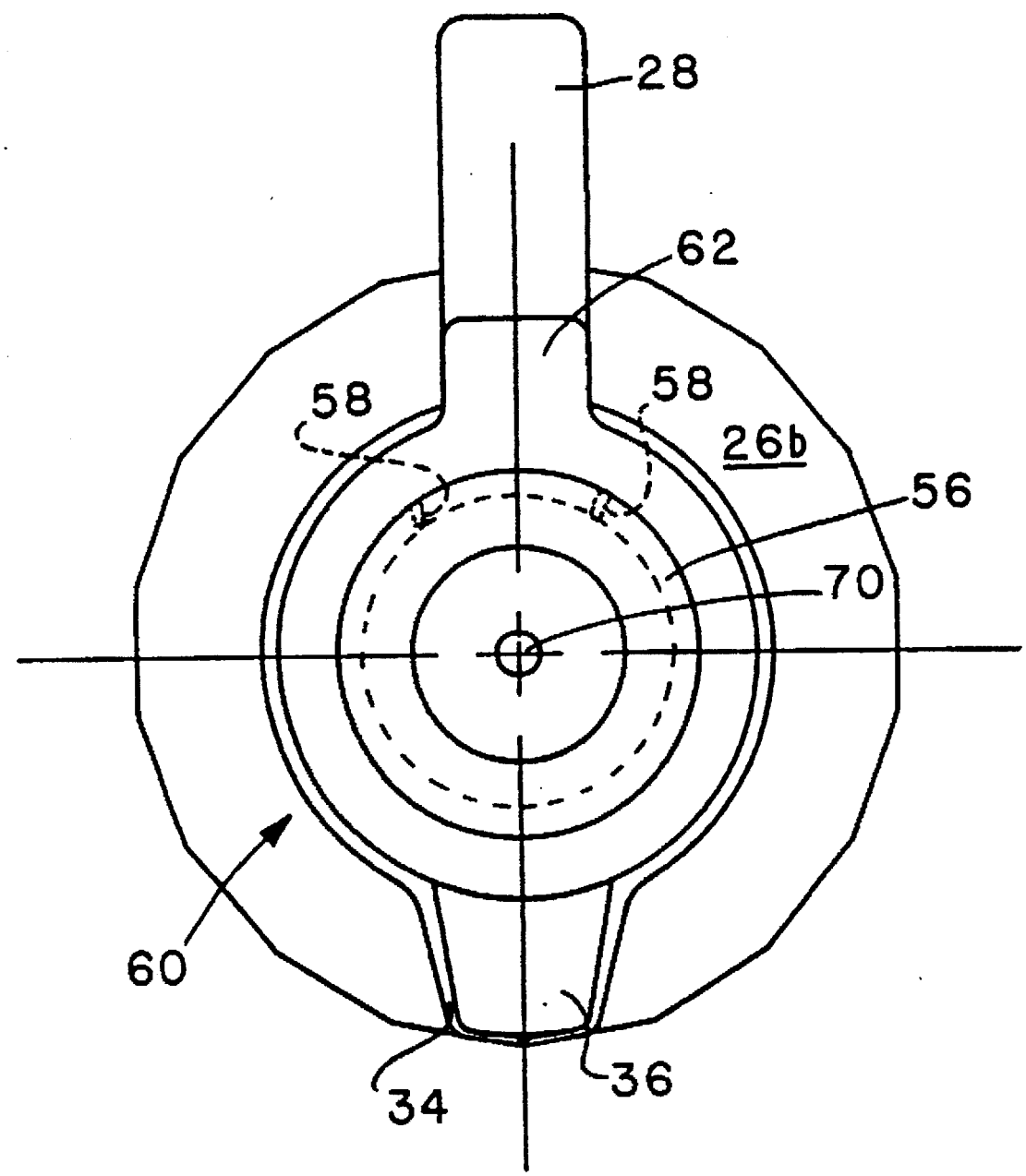
FIG. 2 is a top plan view of the beverage server illustrated in FIG. 1.
Figure 3:
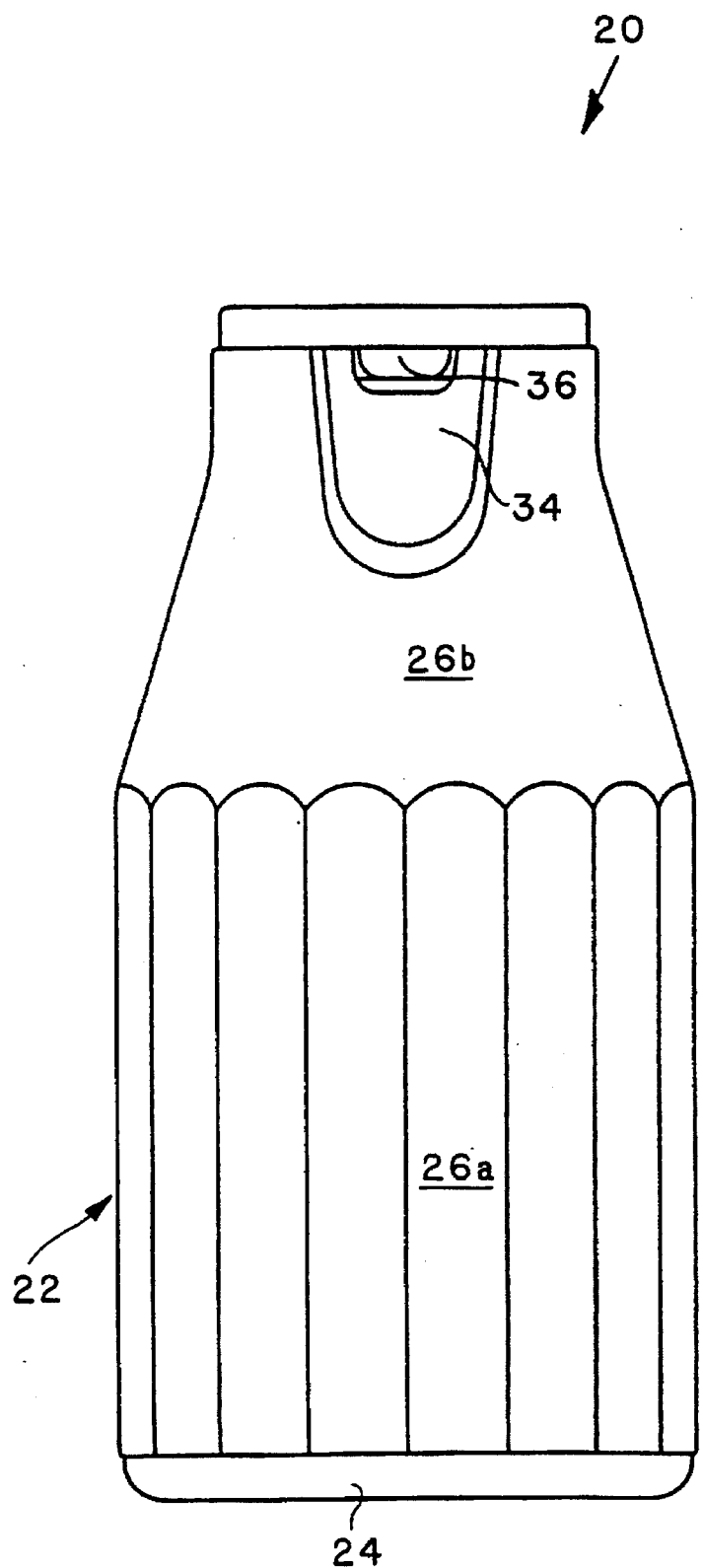
FIG. 3 is a front elevation view of the beverage server illustrated in FIG. 1.

Referring now to FIGS. 1 to 3, a thermal beverage server is shown and is generally indicated by reference numeral 20.

By "thermal" it is meant that the beverage server is designed to minimize heat loss so that hot beverages held therein remain hot for an extended period of time without requiring an external heating source. Similarly, cold beverages held in the beverage server 20 will remain cold for an extended period of time without requiring refrigeration.

As can be seen, the beverage server 20 includes an open topped body 22 having a base 24 and an upstanding continuous body wall 26 about the circumference of the base. The body wall 26 and the base 24 are threadably engaged to allow the base and the body wall to be separated and assembled with ease (see FIG. 4). The lower portion 26a of the body wall 26 is generally constant in diameter while the upper portion 26b of the body wall tapers in diameter towards the top of the body 22. A handle 28 is integrally formed with the body wall 26 allowing the beverage server 20 to be carried conveniently. For comfort, the handle 28 is covered with a sleeve 30 formed of soft, resilient material and is dimensioned so that the beverage server 20 is balanced when carried via the handle. A pair of diametrically opposed, ovate level gauge apertures 32 are formed in the side of the lower portion 26a of the body wall. The apertures 32 are covered by generally transparent protective strips 33 formed of lexane® on the interior of the body wall.

A pouring spout 34 projects outwardly from the body wall 26 at its top and is diametrically opposite the handle 28. The pouring spout 34 has a channel 36 formed in its upper surface which increases in depth in a direction towards the body wall 26. At the top of the body wall 26 above the handle 28 is a projection in the form of a semi-cylindrical bead 40.

Figure 4:
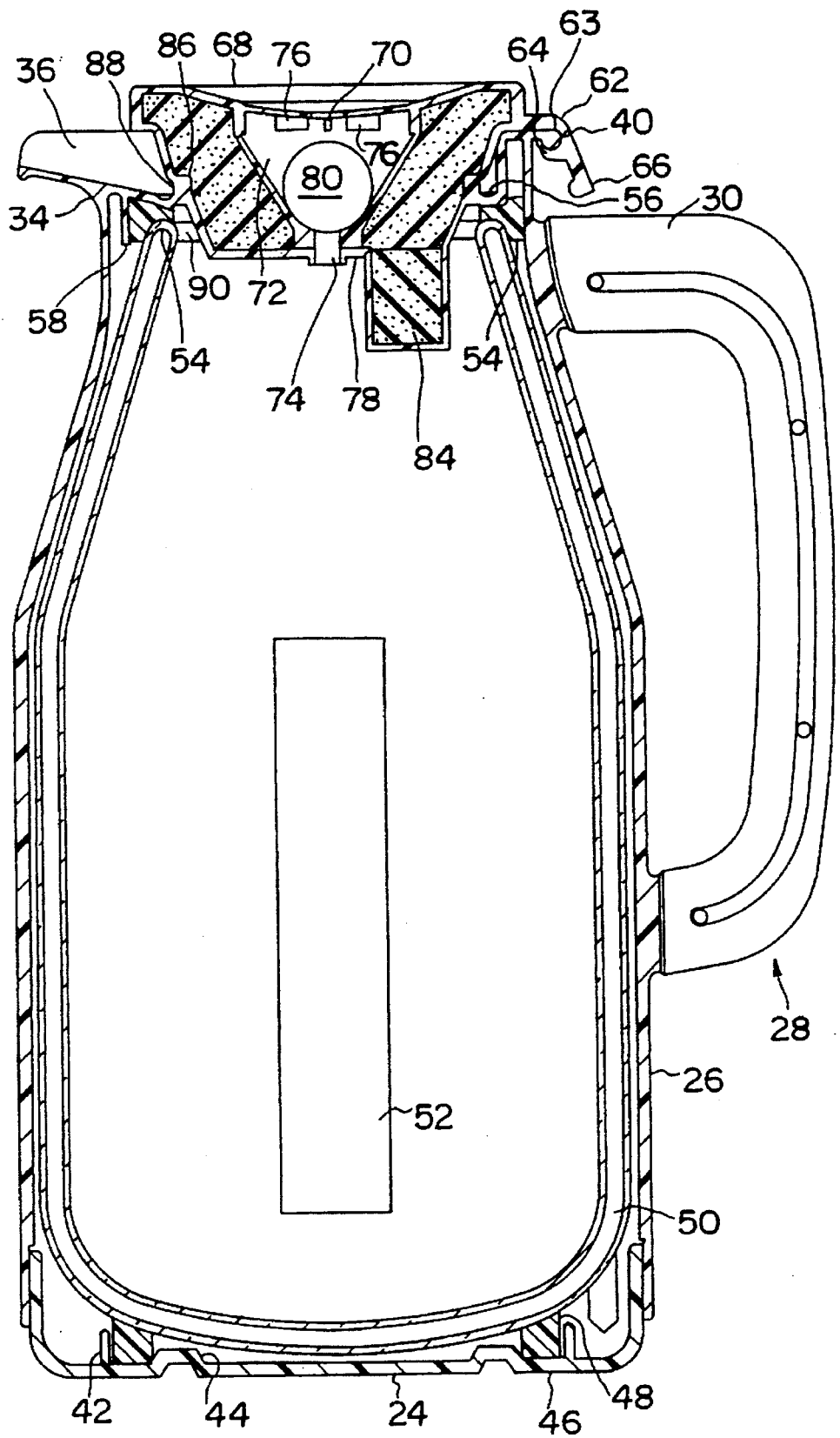
FIG. 4 is a sectional view of the beverage server illustrated in FIG. 1.
Figure 5:
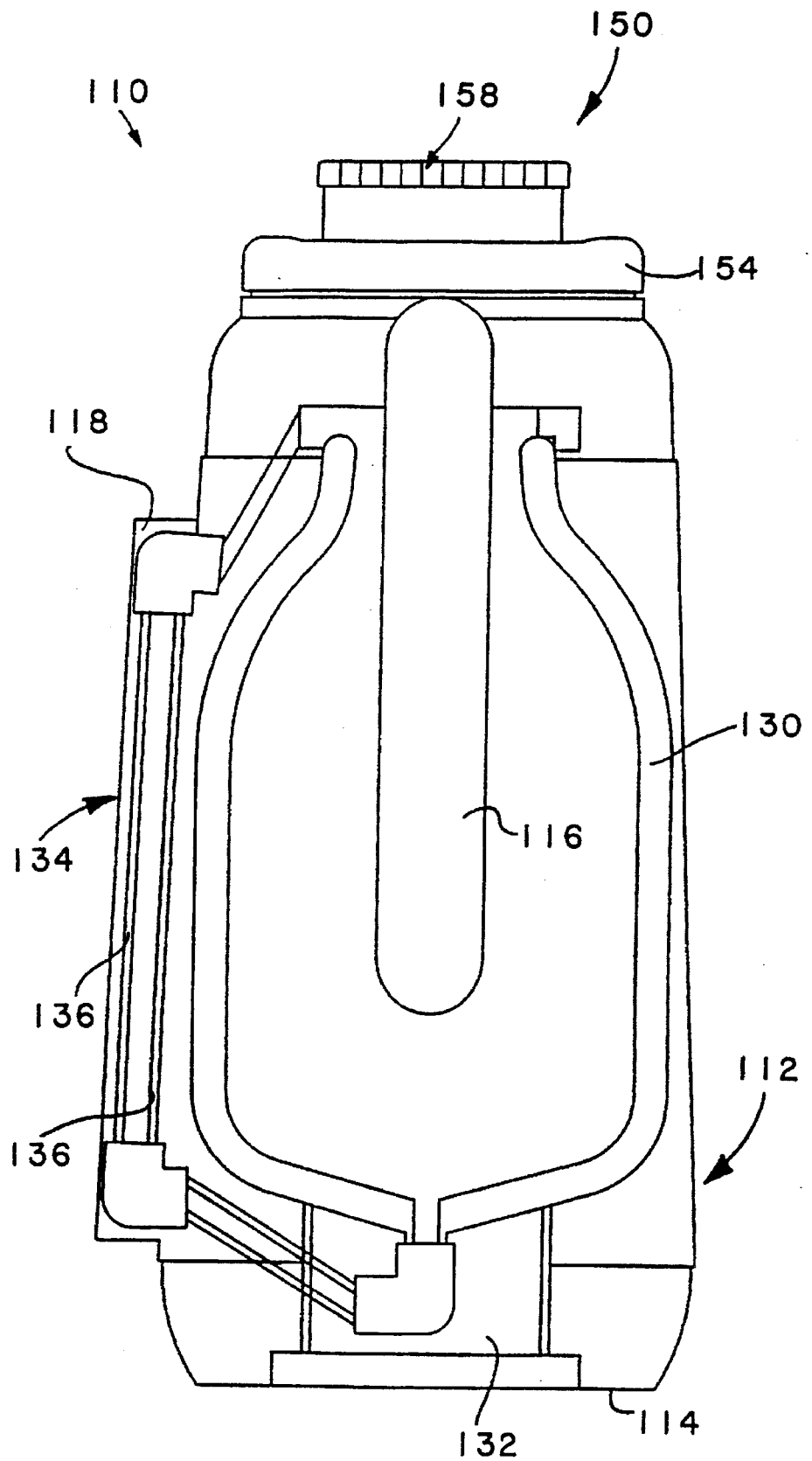
FIG. 5 is a rear elevation view, partly in section, of another embodiment of a beverage server.
Figure 6:
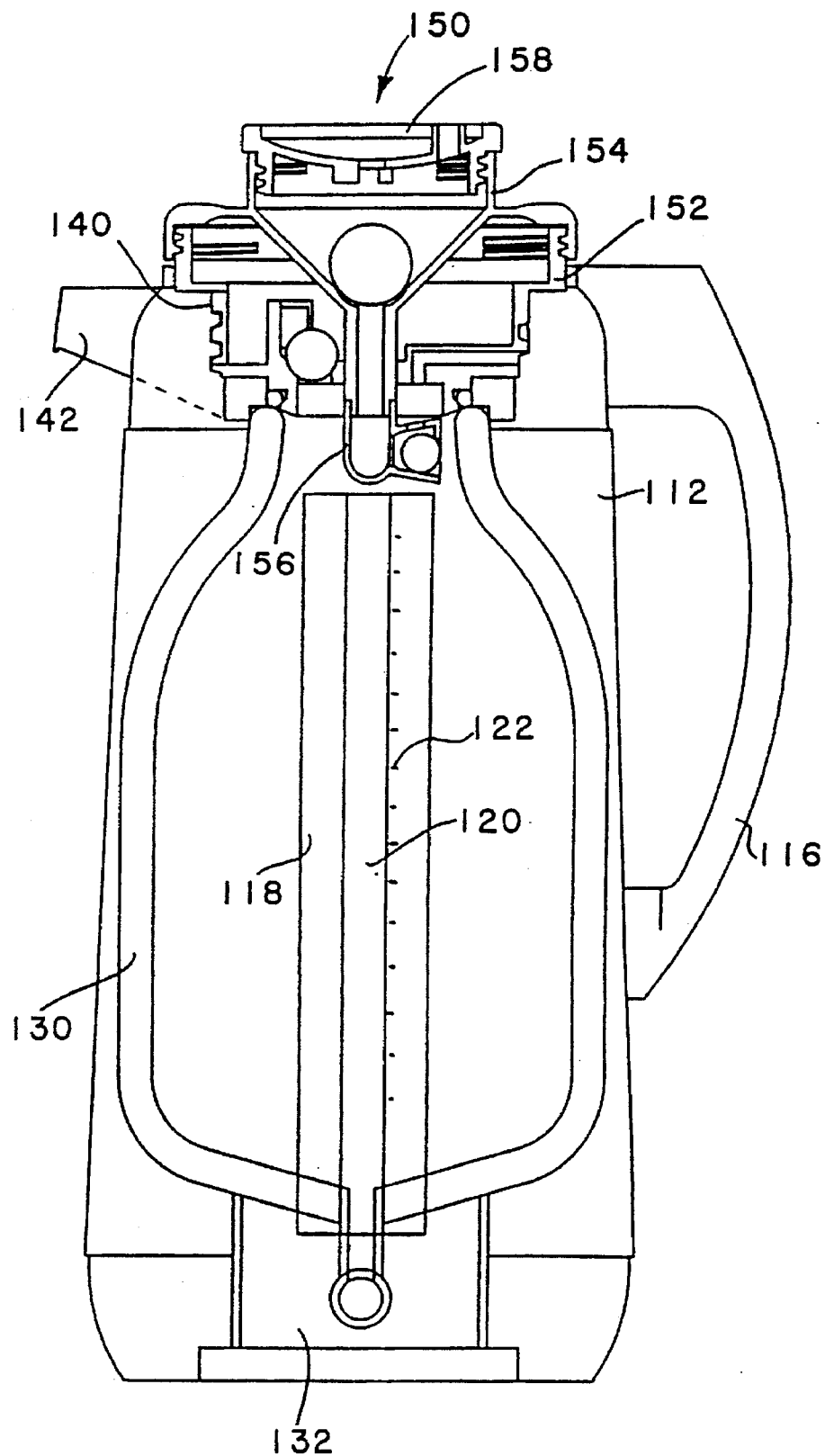
FIG. 6 is a side elevation view, partly in section, of the beverage server illustrated in FIG. 5.
Figure 7:
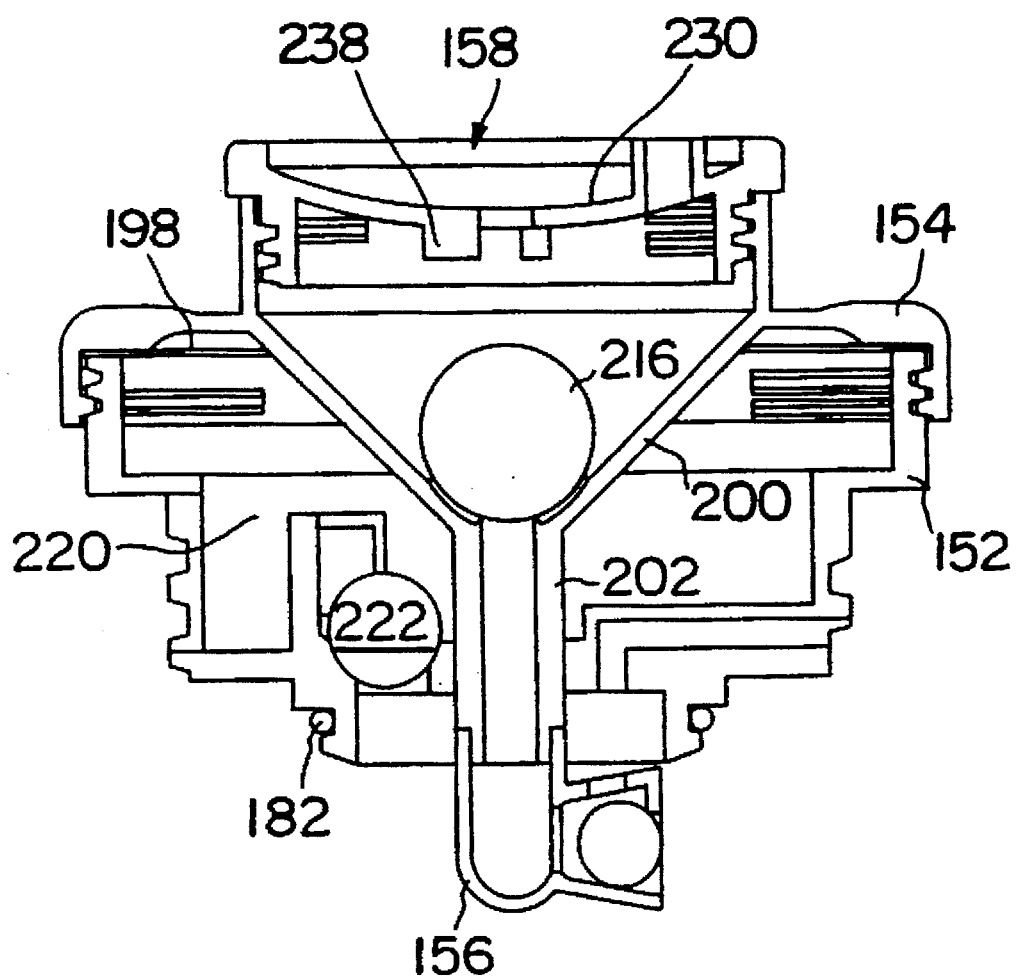
FIG. 7 is a sectional view of a flow through lid forming part of the beverage server illustrated in FIG. 5.
Figure 8:
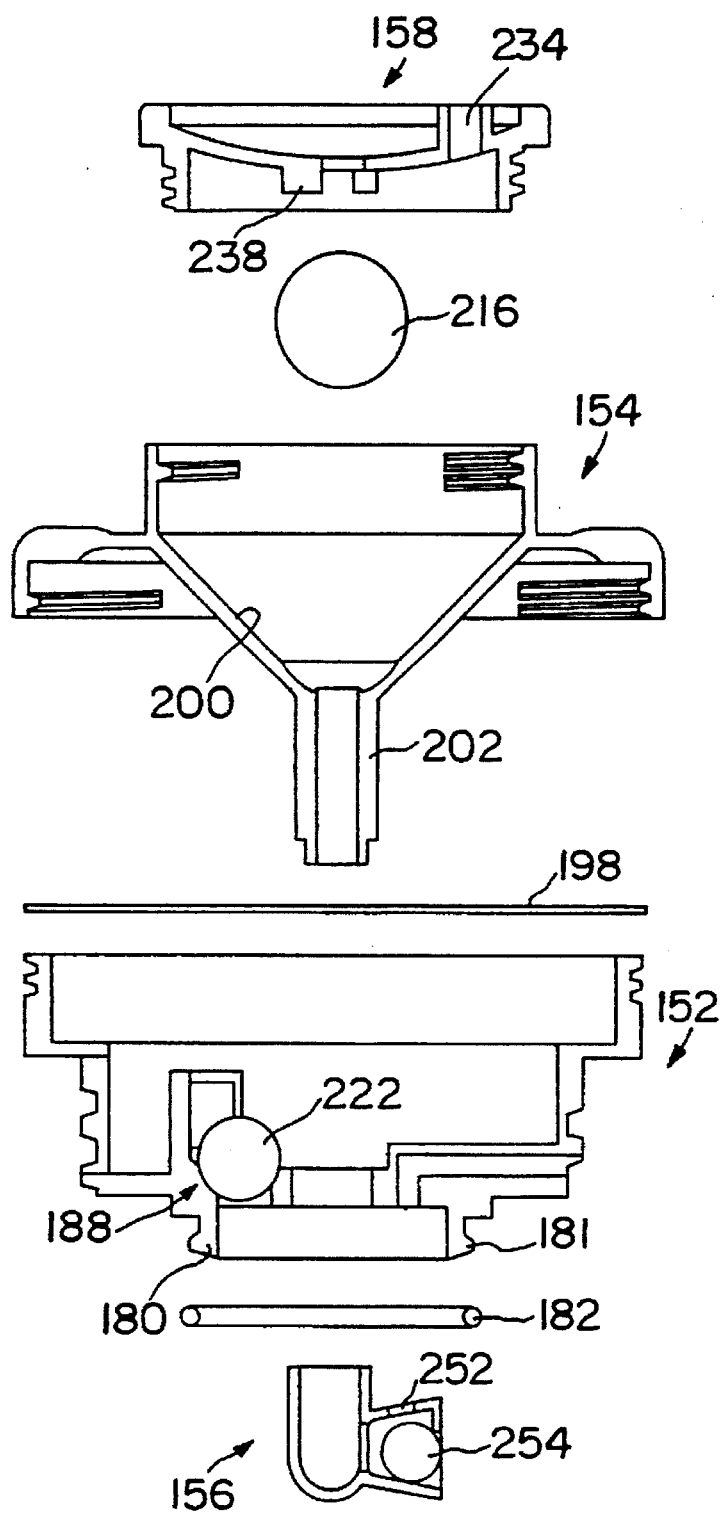
FIG. 8 is an exploded side elevation View of the lid illustrated in FIG. 7.
Figure 9C:
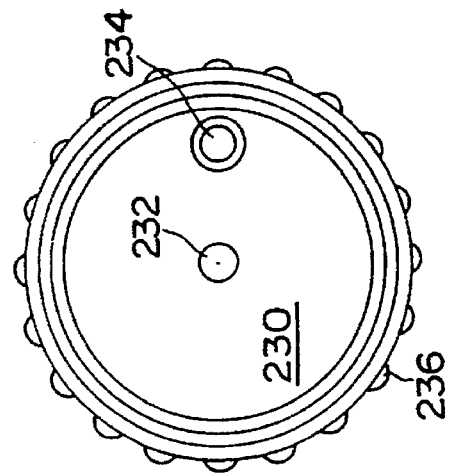
Figure 9D:
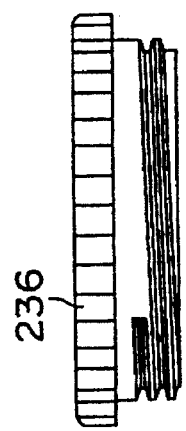
Figure 9A:
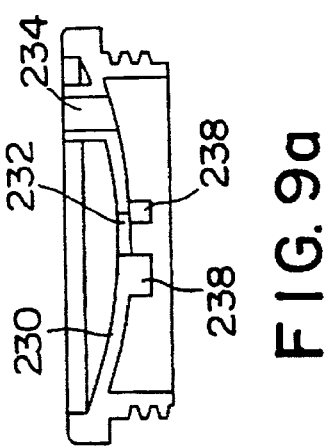
FIG. 9a is a sectional view of a top cap forming part of the lid illustrated in FIG. 7.
Figure 9B:
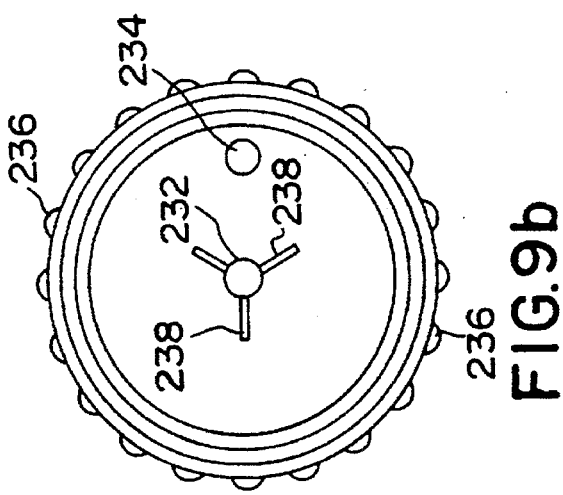
Figure 10A:
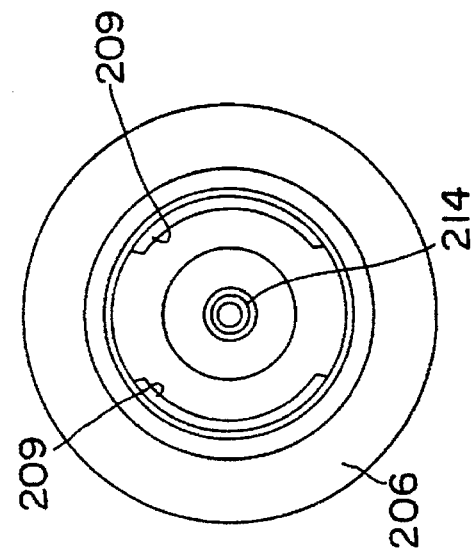
FIG. 10a is a sectional view of a funnel housing forming part of the lid illustrated in FIG. 7.
Figure 10C:
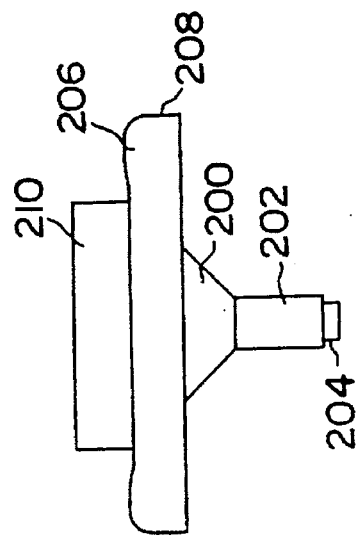
Figure 10B:
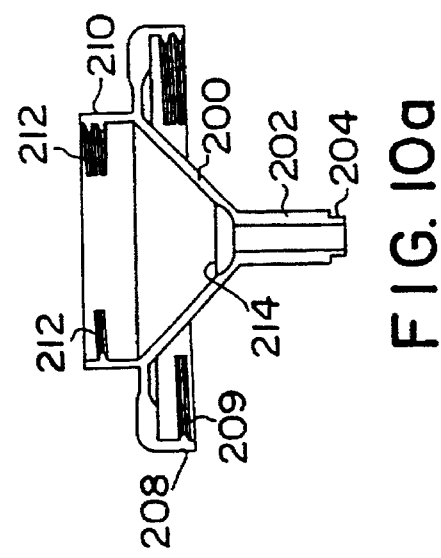
Figure 10D:
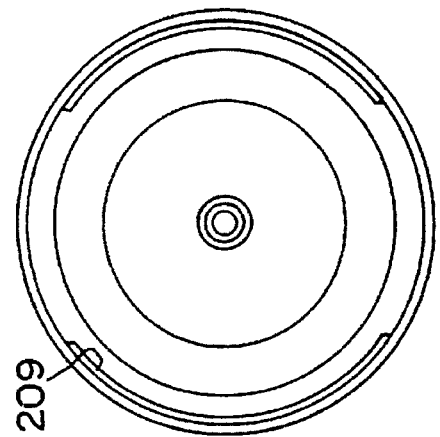
Figure 11A:
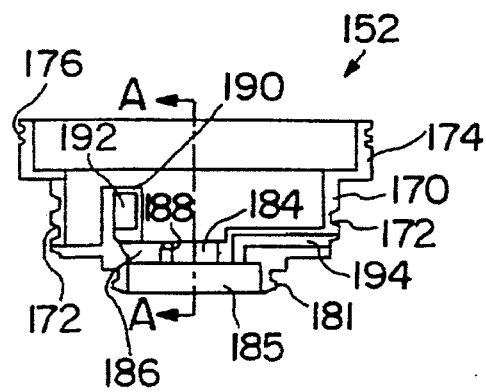
FIG. 11a is a sectional view of a thermos housing forming part of the lid illustrated in FIG. 7.
Figure 11B:
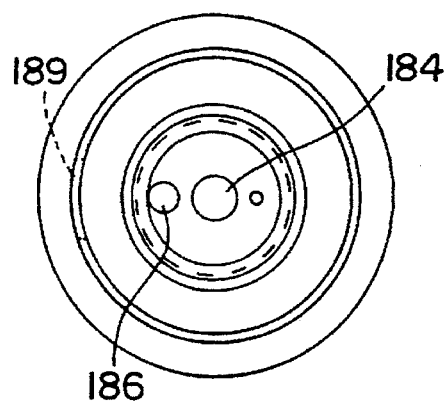
Figure 11C:
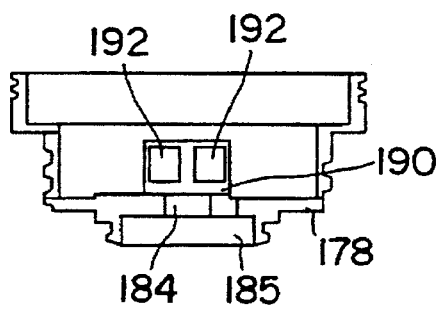
Figure 11D:
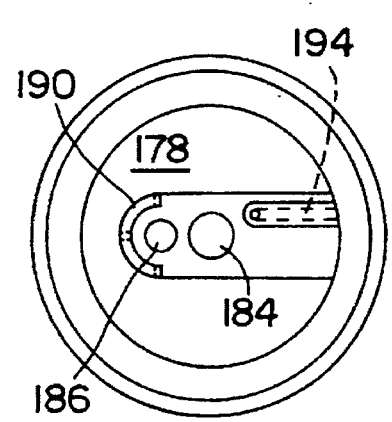
Figure 11E:
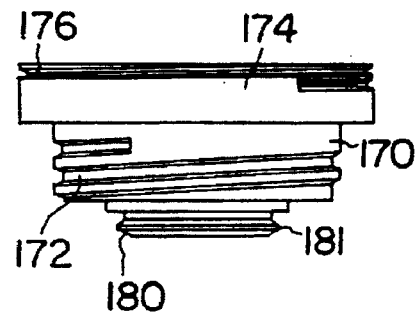

The interior of the body 22 is best seen in FIG. 4. As can be seen, the base 24 has a pair of concentric projections 42 and 44 on it. A slip ring 46 is positioned on the base 24 within the annular location between the projections 42 and 44. An annular support 48 formed of alcryn® sits on top of the slip ring 46. A reservoir 50 in the form of a double walled, silver lined, glass flask rests on the annular support 48. The reservoir 50 has a pair of rectangular viewing windows 52 provided on it which are dimensioned slightly larger than the apertures 32 in the body wall 26. Of note, the viewing windows 52 are formed by removing the generally opaque silver lining in the reservoir 50 at the appropriate locations so that the interior of the reservoir 50 is visible. The slip ring 46 is designed to allow the base 24 to be rotated relative to the body wall 26 without causing rotation of the annular support 48 and hence, the reservoir 50. Thus, during assembly of the beverage server 20, once the reservoir 50 is positioned within the body 22 with the viewing windows 52 and apertures 32 aligned, the base 24 can be secured to the body wall 26 without misalignment of the viewing windows and apertures occurring.

An upper annular support 54 also formed of alcryn® acts between the open top of the reservoir 50 and the interior of the body wall 26. The interior of the body wall is configured to accommodate the annular support 54 to prevent movement thereof once it has been properly positioned and this facilitates assembly of the beverage server 20. Specifically, the bottom surface of the annular support 54 contacts the annular top of the reservoir 50. The top surface of the annular support 54 abuts an internal lip 56 which runs about the interior of the body wall 26 in the same plane as the inner most part of the base of the channel 36. The outer side surface of the annular support 54 contacts the interior of the body wall 26 except at a location beneath the pouring spout 34 where it contacts an internal wall 58 depending from the base of the channel 36.

At the top of the beverage server 20 is an insulated lid 60 filled with foam material, which is pivotally attached to the body 22 as will be described. The lid 60 is generally circular but has an outwardly and downwardly extending projection 62 on it which overlies the bead 40. The projection 62 has a lip 64 formed on its interior surface to define a space 63 to accommodate the bead 40 in a snap-fitting relationship. The projection 62 extends downwardly beyond the lip 64 to define a lever 66 which can be used to pivot the lid 60 relative to the body 22 about the bead 40. The lip 56 has a pair of grooves 58 (see FIG. 2) formed therein to provide vents for the expression of air from the reservoir when the reservoir is being filled with a beverage and the beverage server 20 is upright. The grooves 58 are spaced about 30° apart equi-angularly from the handle 28. The grooves 58 are positioned adjacent the rear of the beverage server 20 to avoid beverage entering the grooves 58 when the beverage server is tilted.

The upper surface of the lid 60 is concave to define a bowl 68. Centrally located at the bottom of the bowl 68 is an aperture 70 that leads to a float chamber 72 within the lid 60. The float chamber 72 is for the most part conical but terminates in a small diameter cylindrical passage 74 extending through to the bottom of the lid. At the top of the float chamber 72 are three stops 76 arranged equi-angularly about the periphery of the aperture 70. An annular ridge 78 is at the bottom of the conical part of the float chamber 72 slightly above the cylindrical passage 74. A floatable ball 80 formed of plastic is housed in the float chamber 72 and has a diameter greater than that of the cylindrical passage 74. When no fluid is in the float chamber 72, the ball 80 rests on the annular ridge 78 to seal the passage and to space the periphery of the ball from the walls of the float chamber 72. This prevents a vacuum from being created between the periphery of the ball 80 and the float chamber 72 which may cause the ball to stick and not float when a beverage enters the float chamber 72.

An arcuate counter-weight 84 having a center of curvature generally at the center of passage 74 projects downwardly from the bottom of the lid 60 at a location opposite the pouring spout 34. The counter-weight 84 is filled with foam material greater in density than the foam material filling the remainder of the lid 60. The counter-weight also accommodates a metal insert such as a rod (not shown).

The exterior side wall of the lid 60 is generally conical and is configured to extend into and accommodate the internal profile of the body 22. A circular groove 86 is formed about the circumference of the lid 60 midway between its top and bottom and accommodates an O-ring seal 88. The O-ring seal 88 is positioned to contact the bottom of the channel 36 and the lip 56, thereby substantially to seal the beverage server 20 and isolate the channel 36 from the reservoir 50 when the beverage server is upright. The counter-weight 84 assists in bringing the O-ring seal 88 into contact with the channel 36 and lip 56. Because the lid 60 tapers inwardly below the O-ring seal 88, a space 90 between the exterior side wall of the lid 60 and the interior of the reservoir 50 is provided to permit fluid flow from the reservoir 50 to the channel 36 when the lid 60 is pivoted to lift the O-ring seal 88 from the base of the channel 36.

In use, when it is desired to fill the reservoir 50 with a beverage such as hot coffee, the beverage server 20 is placed directly below the filter basket of the coffee-making machine used to brew the coffee. Due to the insulated nature of the beverage server, the coffee-making machine should be of the non-hot burner type and is preferably of the type disclosed in U.S. Pat. No. 5,063,836 to Patel and assigned to Cafe 98 Industries Limited, assignee of the present invention.

As coffee is brewed, it passes through the coffee grounds in the filter basket and exits an aperture in the bottom of the filter basket. From there, the coffee drips onto the top of the beverage server 20 and is collected in the bowl 68. The coffee then enters the float chamber 72 via the aperture 70 and begins to fill the float chamber. As the float chamber 72 is filled with coffee, the coffee passes between the periphery of the floatable ball 80 and the walls of the float chamber 72 causing the ball to float in the coffee and lift from the annular ridge 78. This of course exposes the cylindrical passage 74 and allows coffee collected in the float chamber 72 to continue down the cylindrical passage and pass through the lid 60 into the reservoir 50 under the influence of gravity. When coffee enters the reservoir, air is expressed from the reservoir 50 and passes through the spaces defined between the grooves 58 in the lip 56 and the O-ring seal 88. The air then passes to the atmosphere via the clearance between the upper part of the lid 60 and the body 22.

As mentioned before, the provision of the annular ridge 78 ensures that a vacuum is not created between the outer surface of the floatable ball 80 and the walls of the float chamber 72 which may result in the floatable ball becoming stuck in the float chamber. The stops 76 prevent the floatable ball 80 from blocking the aperture 70 when it is floating and coffee is collecting in the float chamber 72.

When a desired amount of coffee has been poured into the reservoir 50 and coffee held in the float chamber 72 has drained into the reservoir, the floatable ball 80 seals the top of the cylindrical passage 74 to minimize heat loss. When it is desired to pour coffee from the beverage server 20 after it has been filled, the beverage server 20 is grasped by the handle 28 and carried to the desired location where the beverage server is tilted with the pouring spout 34 directed to the receptacle which is to receive the coffee. As the beverage server 20 is tilted, the lid 60 pivots relative to the top of the body 22 via the pivotal connection constituted by the snap fit between the projection 62 and the bead 40. As the lid 60 pivots, the O-ring seal 88 lifts from both the base of the channel 36 and the lip 56, allowing coffee to flow from the reservoir 50 to the channel 36 via space 90. The coffee then flows along the channel 36 and exits the beverage server 20 via pouring spout 34.

During the pivotal movement of the lid 60, the counter-weight 84 assists in the smooth pivotal motion of the lid 60 to prevent the coffee in the reservoir 50 from surging into the pouting spout 34. Also, the counter-weight inhibits coffee from entering the float chamber 72 through the cylindrical passage 74 when the beverage server 20 is tilted. In addition, the dimensions of the bead 40 and the lip 56 limit the range of movement of the lid 60 to prevent the top of the body 22 from being exposed. Once the desired amount of coffee has been poured and the beverage server 20 has been moved upright, the lid 60 pivots back to its closed condition assisted by the counter-weight 84 to bring the O-ring seal 88 into sealing engagement with channel 36 and lip 56.

The beverage server 20 is provided with two level gauge apertures 32 primarily for two reasons. Firstly, because the viewing windows 52 are formed by removing some of the opaque silver coating from the interior of the reservoir 50, in order for the beverage level to be seen through an aperture 32, light must enter the reservoir 50. The provision of two apertures ensures sufficient light passes into the reservoir 50 when the beverage level is being visually determined via one of the apertures 32. Secondly, by providing two apertures 32, the beverage level in the beverage server 20 can be determined from either side of the body 22.

When it is desired to clean the beverage server 10, the lid 60 can be easily removed from the body 22 by releasing the snap-fit between the bead 40 and the projection 62 thereby allowing easy access to the interior of the reservoir 50. Because the reservoir 50 has some of its opaque coating removed, the cleanliness of the interior of the reservoir 50 can be visually determined via the apertures 32.

Although the counter-weight has been described as being in the form of an arcuate projection depending from the bottom of the lid, it should be apparent to one of side in the art that other alternatives can be used to achieve the same function. For example, the counter-weight can basically take any shape and can be positioned basically anywhere on the lid. Alternatively, the counter-weight function can be achieved by removing the projection and in its place, adding inserts to the interior of the lid body to weight the lid in the appropriate manner.

Referring now to FIGS. 5 to 8, another embodiment of a thermal beverage server is shown and is generally indicated by reference numeral 110. As can be seen, the beverage server 110 includes a body 112 having a planar base 114 allowing the beverage server to stand upright. A handle 116 integral with the body 112, allows the beverage server to be carried conveniently. A rectangular, level gauge housing 118 projects forwardly of the body and has a window 120 provided on its outermost surface. The window 120 has graduations 122 marked thereon so that the beverage level in the beverage server 110 can be visually determined.

Within the body 112 is a reservoir 130 in the form of a vacuum flask. The reservoir 130 is supported within the body 112 at its bottom by a stand 132. A level gauge 134 is also within the body 112 and is received by the housing 118. Runs of tubing 136 connected at one end to the top of the reservoir 130 and at the other end to the bottom of the reservoir extend the length of the level gauge 134. The runs of tubing 136 fill with beverage to the same level as in the reservoir to provide an indication of the beverage level in the beverage server 110.

The top of the body 112 has a threaded opening 140 to permit access to the reservoir 130. A pouting spout 142 extends through the body near its top. The interior end of the pouring spout 142 is open and is positioned slightly above the reservoir 130. The exterior end of the pouring spout 142 projects forwardly of the body 112 to facilitate pouring of beverages held in the reservoir 130 when the beverage server 110 is tilted.

To minimize heat loss, a lid 150 threadably engages the threaded opening 140 at the top of the body 112. Similar to the previous embodiment, the lid 150 is designed to permit beverages such as hot coffee, to enter the reservoir 130 without requiring its removal and to permit a beverage in the reservoir to be poured out of the beverage server 110 via the pouring spout 142 while inhibiting spilling of the beverage through the lid. The lid 150 and its operation will now be described more fully with reference to FIGS. 7 to 12.

The lid 150 includes basically four major, inter-engaging components, namely a thermos housing 152, a funnel housing 154, an anti-reverse flow pipe 156 and a top cap 158. These four components are removably connectable to one another so that the lid 150 may be disassembled and cleaned as required. The individual components constituting the lid 150 will now be described.

The thermos housing 152 is best illustrated in FIGS. 11a to 11e. The housing 152 is formed of plastic and has a central, cylindrical body portion 170 with a threaded exterior surface 172 which engages with the threaded opening 140 in the top of the body 112. An upper cylindrical body portion 174 of greater diameter then the central portion 170 has threads 176 formed along a portion of its exterior surface adjacent its upper peripheral edge. A lower cylindrical body portion 180 depends from the base 178 of the body portion 170 and is dimensioned to cover completely the top of the reservoir 130 when the lid 150 engages with the body 112. A lip 181 is formed about the circumference of the body portion 180 nearest its lower most edge. An O-ring 182 (see FIG. 8) surrounds the body portion 180 above the lip 181 to assist the body portion 180 in forming a substantially fluid tight seal with the top of the reservoir 130.

A centrally located passage 184 is formed through the base 178 and communicates with the interior opening 185 of the body portion 180. A second passage 186 radially offset from passage 184 is also formed through the bottom of the body portion. The passage 186 liares outwardly at its top 188. A portion 189 of the exterior of the body portion 170 is cut-away to expose a recessed, semi-cylindrical side wall 190. The side wall 190 has a pair of pouring outlets 192 provided through it which align with the pouring spout when the lid 150 is secured to the body 112.

A vent tube 194 runs through the base 178 with one end thereof terminating adjacent the central passage 184 and the other end thereof terminating adjacent the threads 172 on body portion 170.

The funnel housing 154 threadably engages the threads 176 on the upper body portion 174 and is received in the interior of the thermos housing 152. A gasket 198 (see FIG. 8) is positioned between the housing 154 and the housing 152 to prevent any beverage leakage through the engaging threads. FIGS. 10a to 10d best illustrate the funnel housing. As can be seen, the funnel housing 154 includes a generally conical float chamber 200 that terminates in a generally cylindrical tube 202. The tube 202 passes through the passage 184 in the base 178 and terminates within the lower body portion 180. The end of the tube 202 has a recess 204 formed in its outer surface. Surrounding the top of the float chamber 200 is a circular cover 206 having a downwardly curved, outer periphery which terminates in a depending lip 208 about the circumference of the cover 206. The interior surface of the depending lip 208 includes threads 209 to engage the external threads 176 on the body portion 174. At the top of the float chamber 200 is a cylindrical wall 210. A portion 212 of the interior surface of the wall 210 adjacent its upper peripheral edge is threaded.

An annular ridge 214 is formed on the interior surface of the float chamber slightly above the opening to the cylindrical tube 202. A floatable ball 216 (see FIG. 8) formed of plastic rests in the float chamber 200 and has a diameter greater than that of the cylindrical tube 202.

The outer surface of the cylindrical tube 202, the outer surface of the float chamber 200 and the semi-cylindrical wall 190 define a pouring chamber 220 above the passage 186 when the two housings 152 and 154 respectively are in mating engagement. Within the pouring chamber 220 is another floatable ball 222 (see FIG. 8). The floatable ball 222 is received by the larger diameter portion 188 of the passage 186 to seal it when the beverage server 110 is in an upright position but moves out of the passage 186 when the beverage server 110 is tilted.

The top cap 158 covers the open upper end of the funnel housing 154 and threadably engages with the interior threads 212 provided on the wall 210. The top cap 158 is best seen in FIGS. 9a to 9d and has a generally concave upper surface to define a bowl 230. A passage 232 is formed through the centre of the top cap. A cylindrical vent 234 is also formed through the top cap and has side walls projecting above the surface of bowl 230 so that the opening of the vent is level with the upper most surface of the top cap. Spaced ridges 236 are formed about the periphery of the top cap 158 to facilitate its rotation allowing the top cap to be placed on and removed from the funnel housing 154 with ease. The undersurface of the bowl 230 includes three downwardly extending stops 238. The stops 238 are equi-angularly spaced about the periphery of the passage 232.

Figure 12B:
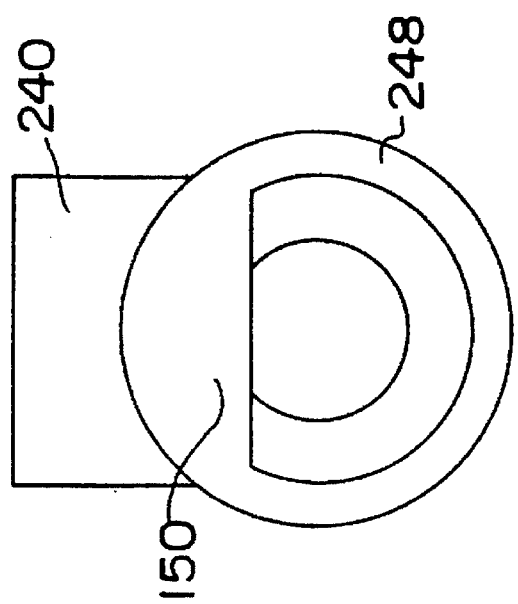
Figure 12A:
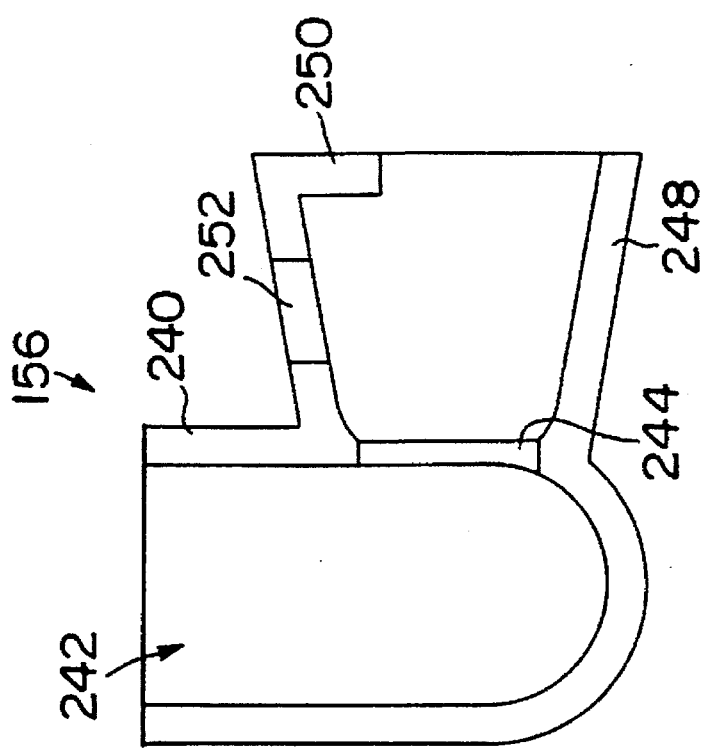
FIG. 12a is a sectional view of an anti-reverse flow pipe forming part of the lid illustrated in FIG. 7.

The anti-reverse flow pipe 156 is best seen in FIGS. 12a and 12b and includes a generally vertical tube 240 having an open top end 242 which is received in the recess 204 formed at the bottom of the cylindrical tube 202. The tubes 202 and 240 are ultrasonically welded together. The bottom of the tube 240 is closed but an aperture 244 is provided through the side wall of the tube adjacent its bottom. A conical tube 248 extends horizontally from the tube 240 and is arranged so that its smaller diameter end surrounds the aperture 244. The larger diameter end of the tube 248 is partially covered by a part-circular wall 250. An aperture 252 is formed in the top of the conical tube 248 midway along its length. Within the conical tube 248 is a relatively heavy ball 254 formed of stainless steel (see FIG. 8). The diameter of the ball 254 is greater than that of the small diameter end of the tube 248 but less than that of the large diameter end of the tube. The provision of the wall 250 prevents the ball 254 from being removed from the tube 248 while still permitting beverage flow past the ball when it enters the tube 248. The aperture 252 allows fluid flow into the reservoir 130 if the large diameter end of the conical tube 248 becomes blocked.

The operation of the beverage server 110 will now be described. When it is desired to fill the reservoir 130 with a beverage such as hot coffee, the beverage server 110 is placed directly below the filter basket of the coffee-making machine used to brew the coffee in the same manner described previously with reference to the first embodiment.

As coffee is brewed, it is collected in the bowl 230 of the top cap 158. The coffee then enters the float chamber 200 via the passage 232 and begins to fill the float chamber 200. The cylindrical vent 234 in the top cap 158 provides a path for the expression of air from the float chamber 200 to avoid air from passing back through the passage 232 and inhibiting coffee flow into the float chamber. The opening to the cylindrical vent 234 is raised with respect to the passage 232 to prevent both the passage 232 and the vent 234 from being submerged.

As the float chamber 200 is filled with coffee, the coffee passes between the periphery of the floatable ball 216 and the walls of the float chamber 200 causing the ball to float in the coffee and lift from the annular ridge 214. The coffee then enters the cylindrical tube 202 and passes into the vertical tube 240 of the anti-reverse flow pipe 156. From there, the coffee flows into the horizontal, conical tube 248 and exits conical tube 248 via aperture 252 wherein the coffee falls into the reservoir 130. Due to the nature of the heavy steel ball 254, and the downwardly sloping walls of the conical tube 248, the steel ball 254 is remote from the smaller diameter opening of the conical tube when the beverage server 110 is upright, ensuring that it is not blocked by the steel ball.

As coffee enters the thermal reservoir 130, air must be expressed from it. To inhibit air from passing back through the anti-reverse flow pipe 156 and the cylindrical tube 202, which may cause bubbling of the coffee in the float chamber 200 and reduce the flow into the reservoir 130, the vent tube 194 is provided. Expressed air entering the vent tube circulates between the clearance in the threads and exits the beverage server 110 via the pouring spout 142.

When a desired amount of coffee has been poured into the reservoir 130 and the coffee held in the float chamber 200 has drained into the reservoir 130, the floatable ball 216 reseats the opening to the cylindrical tube 202 to reduce heat loss. The provision of the vent tube 194 does not increase heat loss to a large extent since the convection forces are not sufficiently large to create rapid air flow therethrough. In addition, while coffee is entering the reservoir 130, the ball 222 in the pouring chamber 220 sits in the larger diameter portion 188 of the passage 186 to seal it and reduce heat loss through the pouring chamber and pouring spout 142.

When it is desired to pour coffee from the beverage server 110 after it has been filled, the beverage server 110 is tilted with the pouring spout 142 directed to the receptacle which is to receive the coffee. As the beverage server is tilted, coffee flows out of the reservoir 130 and into the passage 186. The coffee flow through the passage and the firing of the beverage server, lift the ball 222 from the top 188 of the aperture 186 so that it floats in the pouring chamber 220. The coffee in turn exits the pouring chamber 220 via the pouring outlets 192 188 and flows into the interior end of the pouring spout 142. The coffee then flows along the pouring spout 142 and exits the beverage server 110.

To prevent coffee from exiting the beverage server 110 through the top cap 158 via the float chamber 200, the anti-reverse flow pipe 156 is provided. The anti-reverse flow pipe 156 is oriented so that the horizontal conical tube 248 extends in a direction opposite to that of the pouring spout 142. Thus, when the beverage server 110 is tilted to pour coffee, the steel ball 254 moves towards the smaller diameter portion of the conical tube 248 and seals it. Thus, any coffee entering the conical tube 248 by way of the larger diameter opening, stays in the conical tube or flows through it via apemire 252. When the beverage server 110 is moved to an upright position, the steel ball 254 moves back towards the larger diameter opening of the conical tube 248 and the floatable ball 222 in the pouring chamber 220 moves down to seal the passage 186.

The present invention provides advantages in that a beverage is allowed to enter the reservoir in the beverage server without requiring removal of the lid. The beverage server also allows coffee to be poured from the beverage server by tilting it without any coffee spilling out of the beverage server through the lid.

I claim:

1. A beverage server comprising:
   a body having an open upper end;
   a reservoir within said body adapted to hold a beverage;
   a pouring spout on said body communicating with said reservoir to allow a beverage therein to be poured from said reservoir upon tilting of said beverage server; and
   a lid pivotally connected to said body and covering said open upper end, said lid having a first passage therethrough to allow a beverage to enter said reservoir without removal of said lid; and said lid including a counter-weight means to bring said lid into sealing engagement with said body when said beverage server is upright to isolate substantially, said reservoir from said pouring spout.

2. A beverage server as defined in claim 1 wherein said counter-weight means comprises a counter-weight extending downwardly from said lid.

3. A beverage server as defined in claim 1 wherein said counter-weight means also acts to assist in the smooth pivotal movement of said lid when said beverage server is tilted.

4. A beverage server as defined in claim 3 wherein said lid has a seal about its circumference, said counter-weight means bringing said seal into sealing engagement with a channel in said pouring spout to isolate substantially, said reservoir from said pouting spout when said beverage server is upright.

5. A beverage server as defined in claim 2 wherein said counter-weight means is generally arcuate in configuration, said counter-weight means having a center of curvature generally the same as the center of said first passage and said counter-weight means being diametrically opposite said pouring spout.

6. A beverage server as defined in claim 3 wherein said first passage is in the form of a float chamber having valve means therein, said valve means sealing said first passage when no beverage is entering said first passage.

7. A beverage server as defined in claim 6 wherein said valve means is in the form of a floatable ball.

8. A beverage server as defined in claim 1 wherein said reservoir has an internal surface lined with a generally opaque coating and wherein said body has at least one viewing aperture formed therein, said opaque coating being removed from a portion said internal surface at least at a location adjacent said at least one aperture to allow the beverage level in said beverage server to be visually determined.

9. A beverage server as defined in claim 8 wherein said body has a pair of viewing apertures therein.

10. A beverage server as defined in claim 9 further comprising a generally transparent protective strip positioned between said apertures and said reservoir.

11. A beverage server as defined in claim 1 wherein at least one groove is formed in an interior wall of said body to define a vent for the expression of air from said reservoir when a beverage is entering said reservoir via said first passage.

12. A beverage server as defined in claim 11 wherein two spaced grooves are formed in said interior wall, said two grooves being positioned opposite said pouring spout to avoid beverage entering said grooves when said beverage server is tilted to pour a beverage via said pouring spout.

13. A beverage server comprising:
    a body having an open upper end;
    a reservoir within said body adapted to hold a beverage;
    a pouring spout on said body communicating with said reservoir to allow a beverage therein to be poured from said reservoir upon tilting of said beverage server; and
    a lid covering said open upper end, said lid having a first passage therethrough to allow a beverage to enter said reservoir without removal of said lid; a second passage therethrough allowing a beverage to flow from said reservoir to said pouring spout upon tilting of said beverage server; valve means sealing said first passage to inhibit back flow of said beverage from said reservoir through said first passage upon tilting of said beverage server; and vent means to permit the expression of air from said reservoir when a beverage enters said reservoir.

14. A beverage server as defined in claim 13 wherein said valve means includes a pipe section in communication with said first passage, said pipe having a constriction and a valve member movable to seal said pipe section at said constriction to seal said first passage upon tilting of said beverage server.

15. A beverage server as defined in claim 14 wherein said pipe section is generally conical in shape with the smaller diameter end thereof constituting said constriction and wherein said valve member is in the form of a ball in said pipe section, said ball moving to seal said smaller diameter end upon tilting of said beverage server.

16. A beverage server as defined in claim 13 wherein said second passage includes a pouring chamber housing a second valve member, said second valve member sealing said second passage when said beverage server is generally upright and which is movable to open said second passage upon tilting of said beverage server.

17. A beverage server as defined in claim 16 wherein said second valve member is in the form of a floatable ball in said pouring chamber.

18. A beverage server as defined in claim 17 wherein said first passage includes a third valve member therein to seal said first passage when a beverage is not entering said reservoir and which is movable to open said first passage upon a beverage entering said first passage.

19. A beverage server as defined in claim 18 wherein said third valve member is in the form of a floatable ball and said first passage includes a float chamber housing said ball.

20. A beverage server as defined in claim 1 wherein said counter-weight means comprises an insert in the lid.

* * * * *